United States Patent
Elbaz et al.

(10) Patent No.: US 10,013,579 B2
(45) Date of Patent: Jul. 3, 2018

(54) SECURE ROUTING OF TRUSTED SOFTWARE TRANSACTIONS IN UNSECURE FABRIC

(71) Applicant: Intel Corporation, Santa Clara, CA (US)

(72) Inventors: Reouven Elbaz, Hillsboro, OR (US); Siddhartha Chhabra, Hillsboro, OR (US); Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 14/757,387

(22) Filed: Dec. 23, 2015

(65) Prior Publication Data
US 2017/0185804 A1    Jun. 29, 2017

(51) Int. Cl.
*H04L 9/00* (2006.01)
*G06F 21/72* (2013.01)
(Continued)

(52) U.S. Cl.
CPC ............ *G06F 21/72* (2013.01); *G06F 13/287* (2013.01); *G06F 21/82* (2013.01); *H04L 9/06* (2013.01); *H04L 9/0877* (2013.01)

(58) Field of Classification Search
CPC ........ G06F 21/72; G06F 13/287; G06F 21/82; H04L 9/06; H04L 9/0877
(Continued)

(56) References Cited

U.S. PATENT DOCUMENTS

| 7,415,550 B2* | 8/2008 | Tanaka | G06F 13/28 710/1 |
| 7,779,182 B2* | 8/2010 | Arndt | H04L 49/90 370/241 |

(Continued)

OTHER PUBLICATIONS

Liu J. et al. (May 2012) Building a Flexible and Scalable Virtual Hardware Data Plane. In: Bestak R., Kencl L., Li L.E., Widmer J., Yin H. (eds) Networking 2012. Networking 2012. Lecture Notes in Computer Science, vol. 7289. Springer, Berlin, Heidelberg (Year: 2012).*

(Continued)

*Primary Examiner* — Tae K Kim
*Assistant Examiner* — Feliciano S Mejia
(74) *Attorney, Agent, or Firm* — Schwegman Lundberg & Woessner, P.A.

(57) ABSTRACT

Various configurations and methods for securing and validating trusted input output (IO) data communications within fabric interconnects of processing circuitry are disclosed herein. As an example, a technique for secure routing of trusted software transactions includes operations of a crypto engine and an IO hub to validate trusted transactions such as DMA read and write transactions received from a trusted IO controller, and configuring the fabrics of the circuitry to prevent re-routing or tampering of data from the trusted transactions. In an example, hardware-based identification and verification of the trusted transactions may be performed with use of content addressable memory at the crypto engine and the respective unsecure fabrics, to identify and enforce the trusted transactions that cannot be re-routed. As a result, rogue agents or entities connected to the unsecure fabrics cannot interfere with or intercept data for trusted transactions.

23 Claims, 9 Drawing Sheets

(51) Int. Cl.
*G06F 21/82* (2013.01)
*G06F 13/28* (2006.01)
*H04L 9/06* (2006.01)
*H04L 9/08* (2006.01)

(58) Field of Classification Search
USPC ........................................................ 380/277
See application file for complete search history.

(56) References Cited

U.S. PATENT DOCUMENTS

| | | | |
|---|---|---|---|
| 7,937,595 B1 | 5/2011 | Kumar et al. | |
| 8,572,410 B1* | 10/2013 | Tkacik .................... | G06F 21/72 380/44 |
| 2004/0243836 A1* | 12/2004 | England ................ | G06Q 10/10 726/26 |
| 2007/0174507 A1* | 7/2007 | Conti ...................... | G06F 21/85 710/22 |
| 2014/0215103 A1* | 7/2014 | Cohen .................... | G06F 13/28 710/23 |
| 2016/0364343 A1* | 12/2016 | Case ....................... | G06F 21/00 |
| 2017/0177293 A1* | 6/2017 | Krishnakumar ........ | G06F 3/165 |

OTHER PUBLICATIONS

"International Application Serial No. PCT/US2016/060065, International Search Report dated Feb. 13, 2017", 3 pgs.
"International Application Serial No. PCT/US2016/060065, Written Opinion dated Feb. 13, 2017", 8 pgs.

* cited by examiner

SECURE ROUTING OF TRUSTED SOFTWARE TRANSACTIONS IN UNSECURE FABRIC

TECHNICAL FIELD

Embodiments described herein generally relate to the communication and processing of data in computer systems, and in particular, to the secure communication of data with input output (IO) devices among fabric interconnects of processing circuitry for the computing system.

BACKGROUND

Computing system architectures have been continuously developed and engineered to improve security operations. Techniques to secure IO operations within a computing system are often referred to as "Trusted IO", which may include mechanisms to ensure that the data of an IO device stored within memory are cryptographically secure. For example, some of the objectives of Trusted IO is to ensure that data from device-to-memory operations, such as direct memory access (DMA) transactions, are untampered with and unusable by unintended parties and rogue software or agents, and to protect the secrecy of data in such transactions.

In system-on-chip (SoC) implementations, the on-chip boundary forms a natural security boundary where data and code may be used in plaintext and is assumed to be secure, whereas computing platform memory is assumed to be not secure. Thus, trusted execution environments (TEEs) secure the execution of an application and its associated data when such data is resident in the memory. However, to provide true end-to-end security, TEE environments will have Trusted IO implemented back to the source—the IO device.

Although a variety of cryptographic techniques may be implemented in a Crypto Engine (CE) of the SoC to secure data to and from memory, IO data will still be transmitted in the clear between the CE and the IO device controller. In some scenarios, the fabric which routes data on the path between the device controller and the CE is under the control of the host software, which may be untrusted. As a result, secrets may be exposed if data is re-directed toward a memory-mapped IO space under the control of untrusted software while flowing through the host-controlled fabric of the SoC.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
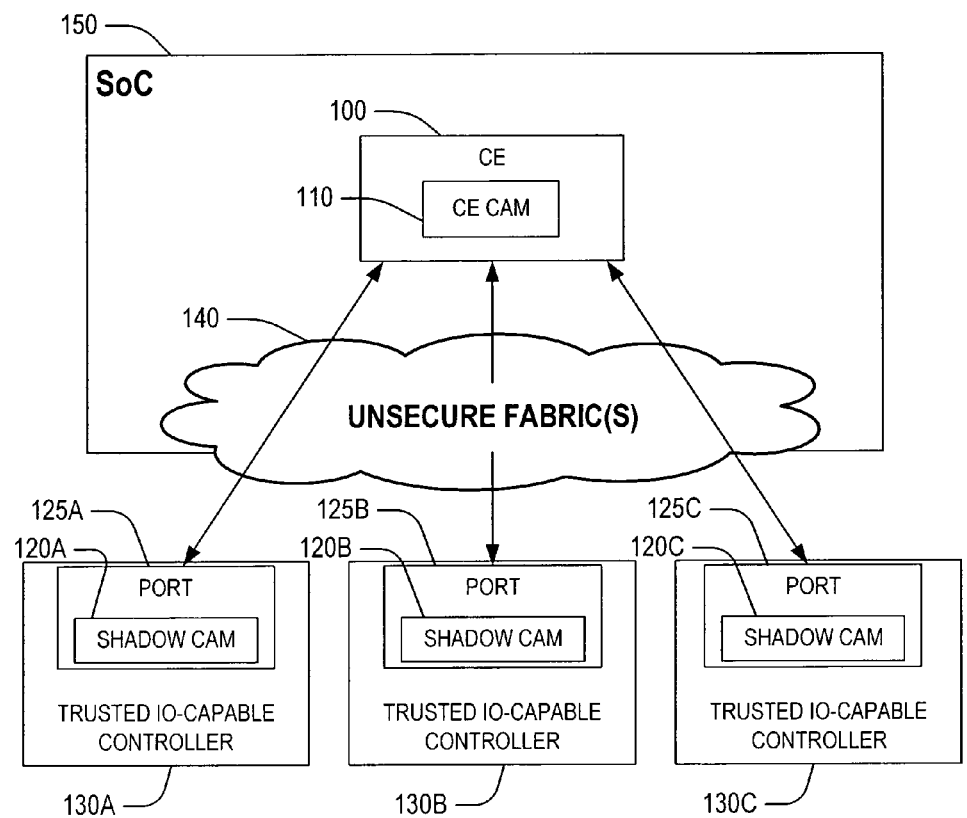
FIG. 1 illustrates a diagram of a computing system architecture implementing trusted IO communications between a crypto engine and respective device controllers, according to an example.

In the following description, methods, configurations, and related devices and apparatuses are disclosed that provide for secure communications with IO devices within processing circuitry such as a SoC. Specifically, the following includes various examples that enable the secure routing of IO transactions within a fabric under the control of untrusted software. As discussed herein, this enables trusted software to initiate secure transactions and use the host-controlled fabric without impacting existing operating system use cases or designs, regardless of the address decoding scheme used. In an example, these techniques are implemented using trusted environment concepts, where known resources are managed by host software, as secure routing mechanisms are used to ensure and verify that secrets are not exposed to unintended parties.

TEEs (for example, implemented by Intel® Software Guard Extensions (SGX) secure enclaves, and ARM® TrustZone® hardware security extensions) are designed to provide protection against certain types of software and hardware attacks. For example, a TEE may provide confidentiality, integrity, and replay-protection to the protected data that it is managing while such protected data is resident in the platform memory. For IO transactions, a TEE may include or use a central cryptographic engine (commonly referred to as a "crypto engine") that sits in the DMA path between the IO device and the memory, thereby protecting the IO data as it moves off the package (which typically represents the trust boundary for the TEE). Such TEEs, however, typically do not protect the IO data prior to its processing by the crypto engine.

As described herein, the presently disclosed techniques and configurations include a mechanism in which trusted IO communications may occur among various fabrics within a SoC and related processing chipsets. For example, the present techniques may be implemented within sideband fabric that designates low bandwidth point-to-point fabric and is used for messaging between SoC agents. The present techniques also may be implemented within mainband fabric to perform communications among high bandwidth fabric used for data transfer in a computing architecture, such as DMA data transactions. The presently disclosed techniques, however, may be adapted for other interfaces and data communication protocols as well.

To mitigate the security threats existing from untrusted software located among an untrusted fabric, the presently disclosed techniques provide a mechanism to provide secure routing to the TEE data transactions from the CE to the controller (i.e., downstream) and from the controller to the CE (i.e., upstream). Further, the presently disclosed techniques provide mechanisms that may be implemented to become transparent to the computing system firmware (e.g., BIOS) and operating system, so that existing IO flows within devices and software are not impacted by the presently disclosed techniques.

In an example, a trusted IO configuration may be implemented to provide hardware-based identification and verification of trusted transactions. In examples further described below, DMA transactions may be tagged with an identifier such as a Channel ID (CID). In an example, a CID is a property that uniquely identifies the bus transactions associated with a DMA channel on a platform, and is unique per DMA in a given platform. A CID may include a Controller ID field (that uniquely defines a controller on a platform) and a DMA Channel Number field (that uniquely defines a DMA channel of a controller). A CID is immutable, and cannot be modified by untrusted agents (e.g., agents not in the trusted computing base (TCB) of the TEE). Also in an example, Content Addressable Memory (CAM) in the CE is used to identify and track secure DMA transactions using the CID. Trusted software (e.g., authorized software or agents in the TCB of a TEE) programs the CE CAM with trusted controller IDs (CID) and corresponding keys. When a DMA transaction reaches the CE, if there is a match with the stored information in the CE CAM, the CE encrypts writes to memory or decrypts reads from memory. A DMA transaction that does not have a match with information in the CE CAM is not from a trusted source, and is passed through in the clear without encrypting/decrypting. In examples further described below, data that is written to memory from a trusted IO controller (e.g., an upstream flow) to be consumed by trusted software applications may be encrypted by the CE with a controller-specific key. Data that is produced and encrypted by trusted software applications and read from memory by a trusted IO controller (e.g., a downstream flow) may be decrypted by the CE with the controller-specific key.

Downstream and after decryption, secure data must reach only the IO controller targeted by a trusted software application. Likewise, unencrypted trusted data flowing upstream toward the CE must reach the CE and not be re-directed toward a rogue agent (e.g., unauthorized peer intellectual property (IP)). In order to prevent malicious software from reconfiguring the fabric to redirect unencrypted data toward a memory-mapped IO (MMIO) space accessible to untrusted software, the present techniques involve the use of a "shadow CAM" at respective controllers and fabrics of the computer architecture. Such shadow CAMs may be used to define the authentic destination for respective transactions and data. Accordingly, the authentic location for data writes and data reads during a memory transaction such as DMA may be defined and enforced in the computing architecture to prevent redirection of unencrypted data to rogue or unintended agents.

FIG. 1 illustrates a diagram of a computing system architecture implementing trusted IO communications between a crypto engine and respective device controllers, according to an example. As shown in FIG. 1, a crypto engine (CE) 100 is configured to perform communications with a plurality of trusted IO-capable controllers 130A, 130B, 130C. In an example, the communications between the CE 100 and the IO controllers 130A, 130B, 130C will occur over one or more unsecure fabrics 140 or other interconnects within a SoC 150, a chipset, or like processing circuitry. The presently described trusted IO routing mechanism may be implemented to prevent redirection of data to incorrect agents in the unsecure fabrics 140. Specifically, the trusted IO routing mechanism may be implemented through the following configuration of content addressable memory (CAM) and tracking of respective controller IDs for the IO controllers 130A, 130B, 130C.

In the configuration depicted in FIG. 1, a CE CAM 110 exists in the CE 100 for tracking secure data transactions among controllers of the system, for example, the IO controllers 130A, 130B, 130C. Additionally, in the configuration depicted in FIG. 1, a shadow CAM resides in each IO controller's port (in ports 125A, 125B, 125C), as shown with shadow CAMs 120A, 120B, 120C respectively for the IO controllers 130A, 130B, 130C. Each shadow CAM is programmed to contain a list of identifiers (e.g., CIDs) that a given port cannot claim. In an example, every time the CE CAM 110 is updated with information to indicate a secure data transaction, the shadow CAMs 120A, 120B, 120C are updated through sideband fabric, except for the controller associated with the target CID. (The sideband fabric property is point-to-point such that a secure IO transaction cannot be redirected.) This mechanism, as discussed further below, is used to ensure that a controller that is not associated with the target CID does not access or interfere with a secure data transaction between the CE 100 and another IO controller.

In an example, when an IO data transaction reaches a destination (e.g., one of the IO controllers 130A, 130B, 130C), the CID attached to the IO data transaction is compared to the CID contained in the shadow CAM of the respective controller (e.g., shadow CAMs 120A, 120B, 120C). If there is a match, a trusted IO session is on-going and the IO data transaction should not have reached this destination, and the IO data transaction is aborted at this destination. If there is no match, the IO data transaction may proceed at this destination. In other words, the shadow CAM may be programmed and updated to identify secure IO transactions that cannot be interfered with.

In an example, the CE CAM 110 in the Crypto Engine (CE) is used to maintain data values for secure DMA transactions that read and write data from computing system memory (e.g., volatile DRAM). Trusted software, such as authorized software operating in a TEE, programs the table in the CE CAM 110 with controller IDs (CID) of respective controllers to perform the secure DMA transaction, and programs the table in the CE CAM 110 to include information to identify corresponding keys for encrypting and decrypting IO data from the respective controllers for secure storage in memory. When a DMA transaction reaches the CE 100, if there is a match with the CID information for the trusted controller associated with the secure DMA transaction in the CE CAM 110, the CE 100 encrypts writes of this data to memory or decrypts reads of this data from memory. (Non-matches may be passed through the CE in the clear, without encryption or decryption.) In further examples, other information may be maintained in the CE CAM 110, such as a counter to prevent replay attacks, mode bits, or other information used to identify characteristics of the DMA transaction or CID, the fabric configuration, or to perform associated cryptographic operations.

Accordingly, with this encryption and decryption technique, data input by a user for consumption by secure applications may be written to the memory from controller (an upstream flow) and encrypted by the CE 100 with a controller-specific key. Likewise, data produced and encrypted by secure applications (e.g., trusted software operating in a TEE) and read from the memory by the IO controller (a downstream flow) may be decrypted by the CE 100 with controller-specific key. This provides the first aspect of the trusted IO transaction: ensuring the authenticity of the data transaction from a valid source.

In an example, the shadow CAMs 120A, 120B, 120C in the respective IO controllers 130A, 130B, 130C are updated with information to detect redirection and prevent data from reaching an untrusted target. For example, a shadow CAM may be programmed in each secure IO controller's port (e.g., ports 125A, 125B, 125C) to contain the list of CIDs that a given port cannot claim. At reset, the shadow CAMs 120A, 120B, 120C are empty. When a trusted IO session for a secure DMA transaction starts (e.g., for a secure DMA with IO controller 130A), the CE CAM 110 is programmed with a CID of the secure DMA transaction and an encryption key associated with the particular controller (e.g., IO controller 130A). In turn, all the shadow CAMs (e.g., shadow CAMs 120B, 120C) except the shadow CAM of the IO controller with the target CID (e.g., shadow CAM 120A) are updated (e.g., through sideband fabric) to identify the CID of the secure transaction. This mechanism may be used to prevent re-routing by overriding the fabric configuration when a trusted IO flow is on-going and untrusted configuration impacts trusted IO security objectives.

In an example, the CE 100 may broadcast a shadow-CAM update message to all shadow CAMs, and the IO controller that is assigned the CID corresponding to the CID in the message (e.g., shadow CAM 120A) may reject the update. In another example, this update message may be sent by processor microcode, such as initiated by an instruction. Likewise, when a CID and a key are un-programmed from the CE CAM 110, a similar programming mechanism may be used to release the corresponding CID from the shadow CAMs (e.g., shadow CAMs 120B, 120C), so that other transactions potentially coming from peers may proceed. This provides the second aspect of the trusted IO transaction: ensuring that the data from the data transaction is not shared with unauthorized entities.

In an example, the CE 100 and the CE CAM 110 may be programmed through a set of instruction set architecture (ISA) instructions. For example, in order to allow the shadow CAMs to be programmed, an ISA instruction may be extended to allow the processor microcode (e.g., ucode) to determine whether the programming of the shadow CAMs 120A, 120B, 120C is complete as well.

In an example, an evaluation of whether the shadow CAMs 120A, 120B, 120C are correctly programmed may be performed before a trusted application initiates a trusted IO session so the system ensures that the fabric routing has been securely configured. Without this verification, a trusted application that attempts a data transaction may encounter fabric routing that is not secured, thus presenting a possibility of data leakage through attacks by unauthorized software.

Accordingly, in spite of the untrusted software configuring the fabric, the present techniques may be used to ensure that data cannot be re-directed to untrusted sources. As discussed further in the following paragraphs, this may be accomplished through two possible mitigations: detect and drop re-directed cycles/transactions to make sure that the data is not disclosed; or, override a fabric decision if it impacts trusted IO security objectives.

Figure 2:
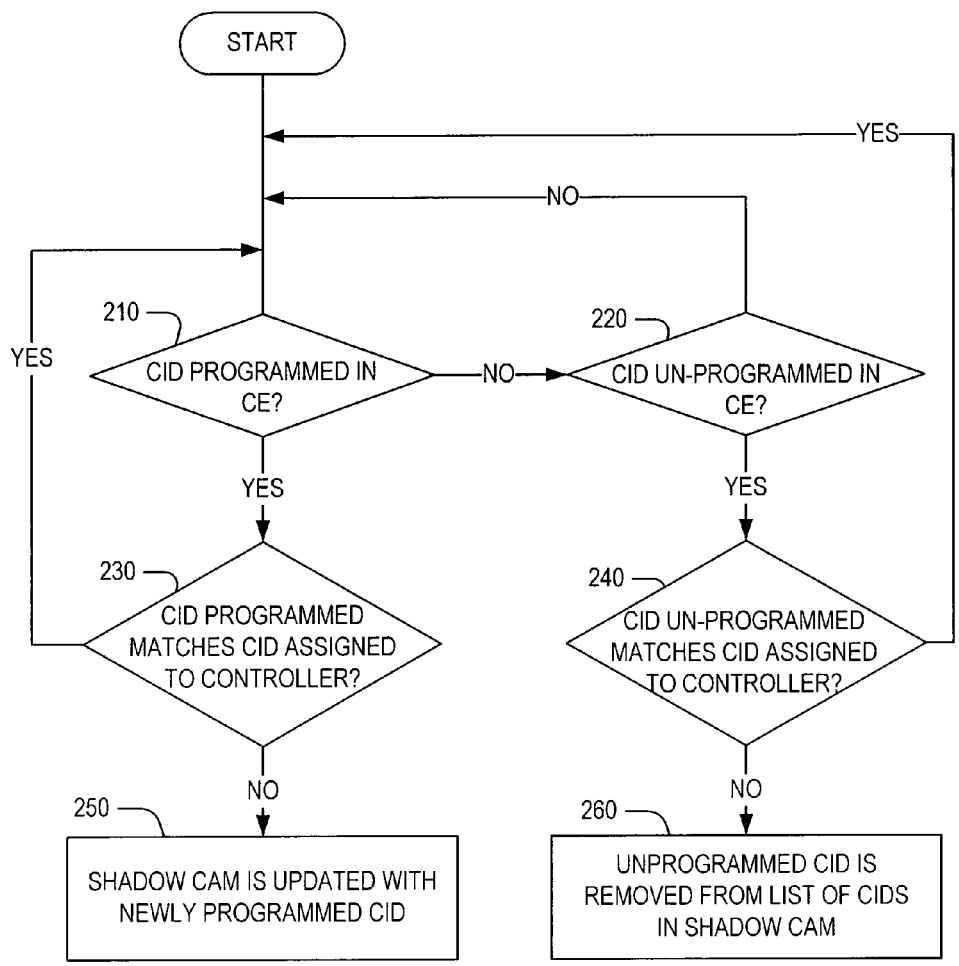
FIG. 2 illustrates a diagram of flowchart implementing a verification of a fabric routing configuration for trusted IO communications between a crypto engine and respective device controllers, according to an example.

FIG. 2 illustrates a diagram of flowchart implementing a verification of a fabric routing configuration for trusted IO communications between a crypto engine and respective device controllers, according to an example. The diagram of FIG. 2 provides a further depiction of a verification technique described above, as the processing circuitry issues commands to configure the various controllers to add or remove CIDs associated with secure data transactions.

As depicted, the flowchart of FIG. 2 starts at an evaluation state prior to attempting a data transaction such as a secure DMA transaction to or from memory. This secure data transaction is associated with a CID that is assigned to a particular destination such as a trusted IO controller. The operations of the flowchart continue by performing a determination of whether the CID for the secure data transaction is programmed in the CE (determination 210), such as being programmed in a CE CAM. If the CID is programmed in the CE, then a further evaluation is performed to determine whether the CID that is programmed in the CE matches a CID assigned to the controller (determination 230). If the CID programmed in the CE matches the CID assigned to the controller, then an update to the shadow CAM for the controller is not necessary; if the CID programmed in the CE does not match the CID assigned to the controller, then the shadow CAM for the controller is updated with the newly programmed CID (operation 250).

In the case where it is determined that a CID and a key are unprogrammed from the CE, a similar mechanism may be used to release the corresponding CID from the shadow CAMs so that transactions potentially coming from peers may proceed. Returning to the result of determination 210, if it is determined that a CID is not programmed in the CE, a further evaluation is performed to determine whether the CID has been unprogrammed in the CE (determination 220). If the CID is not unprogrammed in the CE, then no further action is taken. If the CID is unprogrammed in the CE, then a further determination is performed to determine whether the CID that is unprogrammed from the CE matches the CID that is assigned to the controller (determination 240). If the CID that is unprogrammed from the CE does not match the CID that is assigned to the controller, then the unprogrammed CID is removed from the list of CIDs in the shadow CAM (operation 260). If the CID unprogrammed from the CE matches the CID assigned to the controller, then no further action needs to be taken.

In an example, the shadow CAM update process may be performed through use of processor microcode and one or more instructions, and in further examples, through the use of a command and channel information (e.g., a key). For example, a CID programming operation may include taking a secure CE programming command that has been encrypted and authenticated using a first instruction, and decrypting the command and verifying its integrity via a second instruction, and programming the command to the CE to program/unprogram/re-program a channel. In order to support secure routing with the techniques described herein, the CID programming operation may further program the channel information to the CE over sideband fabric, and initiate sideband transactions to the respective controllers. The sideband transaction for shadow CAM programming may be intercepted by the shadow CAM logic. The shadow CAM then may respond in accordance with the configuration technique described above for FIG. 2.

In some examples, variations of security threats for IO data flows may be present in the computer architecture.

These security threats, as discussed below, may be addressed with use of the presently disclosed techniques and configurations. For example, consider the following threats against trusted output and trusted input data flow operations:

Malicious IP—Trusted Input: for example, malicious IP injecting transactions toward a CE to corrupt trusted input data. The security objective impacted is integrity, and the data flow impacted is trusted input. This security objective is addressed in the data flows described below for FIG. 3A.

Malicious IP—Trusted Output: for example, malicious IP injecting fabric transactions toward trusted IO-enabled IP to corrupt trusted output data. The security objective impacted is integrity, and the data flow impacted is trusted output. This security objective is addressed in the data flows described below for FIG. 3B.

Malware—Trusted Input: for example, malware using DMA to inject transactions toward a CE to corrupt trusted input data. The security objective impacted is integrity, and the flow impacted is trusted input. This security objective is addressed in the data flows described below for FIG. 3A.

Malware—Trusted Output: for example, malware using DMA to inject transactions toward trusted IO-enabled IP to corrupt trusted output data. The security objective impacted is integrity, and the data flow impacted is trusted output. This security objective is addressed in the data flows described below for FIG. 3B.

Malicious IP/Malware—Trusted Input: for example, a Host or Malicious agent, reconfiguring the fabric to re-direct trusted input/upstream cycle for Rogue IP intercepting upstream traffic. The security objective impacted is confidentiality, and the data flow impacted is trusted input. This security objective is addressed in the data flows described below for FIG. 4A.

Malicious IP/Malware—Trusted Output: for example, a Host or Malicious agent reconfiguring the fabric to re-direct trusted output/downstream cycle for Rogue IP intercepting downstream traffic. The security objective impacted is confidentiality, and the data flow impacted is trusted output. This security objective is addressed in the data flows described below for FIG. 4B.

Figure 3A:
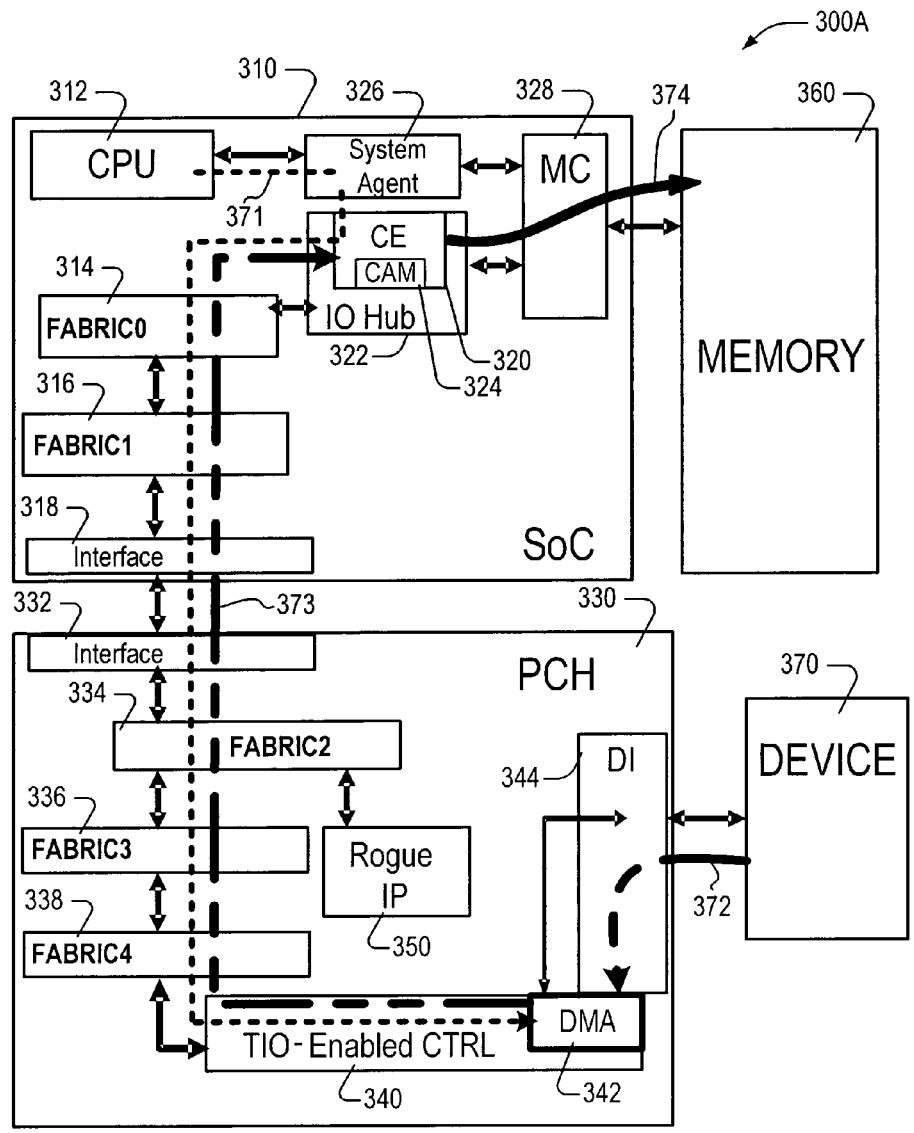
FIG. 3A illustrates a block diagram of a computing system architecture implementing an input data flow between a device and a crypto engine using a configured crypto engine, according to an example.

FIG. 3A illustrates a block diagram of a computing system architecture 300A implementing an input data flow between a device and a crypto engine using a crypto engine and controller configuration, according to an example. It will be understood that a variety of other components of the computing system architecture 300A are not shown for simplicity, while a higher-level overview of a further computing system architecture is discussed herein with reference to FIG. 6.

As shown, the computing system architecture 300A includes a SoC 310 in coupled communication with a platform controller hub (PCH) 330. The SoC 310 is further in coupled communication with a memory 360 (e.g., DRAM volatile memory), and the PCH 330 is further in coupled communication with a device 370 (e.g., a trusted IO device). In an example, SoC 310 is in communication with the PCH 330 via an interface 318 (e.g., a direct media interface-compliant (DMI) interconnect) implemented in the SoC 310, and an interface 332 (e.g., a DMI-compliant interconnect) implemented in the PCH 330. The SoC 310 is in communication with the memory 360 via a memory controller (MC) 328, whereas the PCH 330 is in communication with the device 370 via a device interface (DI) 344 (e.g., a USB, SATA, or general purpose input/output (GPIO) interface).

The SoC 310 includes the MC 328 in addition to a central processing unit (CPU) 312, a system agent 326 to decode addresses from the CPU, an IO Hub 322 (e.g., IO Port or IO Root Complex), and a CE 320 included in the IO Hub 322. The CPU 312 is in communication with the MC 328 via the system agent 326, and the MC 328 is in communication with the IO Hub 322. The SoC 310 includes a series of fabrics for communication between the CE 320 and the interface 318 to the PCH 330, including as depicted, Fabric0 314, and Fabric1 316.

The PCH 330 further includes a trusted IO-enabled controller (Trusted IO Controller 340). The Trusted IO Controller 340 includes DMA functionality 342 to communicate with the device 370 via the DI 344 and to perform DMA transactions to read and write with the memory 360. Such DMA transactions are facilitated to the memory 360 through communication with the interface 332 and the SoC 310 via a series of fabrics, including, as depicted, Fabric2 334, Fabric3 336, and Fabric4 338. In an example, the Trusted IO Controller 340, the DMA functionality 342, and the DI 344 are integrated into a single IP block and are treated logically as a single component or module by software. Also in an example, the Trusted IO Controller 340 may be connected to a plurality of devices (not depicted) in addition to the device 370.

In an example, the respective fabrics 314, 316, 334, 336, 338 may be a highly configurable backbone IP block based on PCI Express® (PCI-e), ARM®, Intel®, or proprietary specifications. For example, the fabrics may include a primary scalable fabric (PSF) based on based on the Intel® On-Chip System Fabric (IOSF) specification. Also for example, switches may be used to create a PCIe-compliant hierarchy that provides interconnection of intellectual property (IP) blocks within SoC circuitry (such as the SoC 310) or within an IO subsystem (such as the PCH 330). A single SoC (such as the SoC 310) and a single PCH (such as the PCH 330) may have one or more switches, at least one of which is coupled to a CPU (such as the CPU 312) through a system agent (such as the IO Hub 322).

FIG. 3A further depicts an input flow among the SoC 310 and PCH 330, occurring from the device 370 to the memory 360. This input flow is implemented with depicted data flows 371, 372, 373, 374. For example, an untrusted data flow 371 may first occur from the CPU 312, through the SoC 310, to the DMA functionality 342 of the Trusted IO Controller 340. This untrusted data flow 371 may occur as the result of an untrusted driver, for example, executing with instructions in an operating system via the CPU 312. The untrusted data flow 371 configures the DMA transaction with the DMA functionality 342 of the Trusted IO controller, then "rings the doorbell" of the controller 340 to enable input DMA transactions.

Next, the data input from the device 370 occurs to the Trusted IO Controller 340 with data flow 372. This data flow 372 is received by the DMA functionality 342, and is then processed by the Trusted IO Controller 340 for further communication of the subject data to the memory 360 through the various fabrics and interfaces of the PCH 330 and the SoC 310. The data flow 373 from the Trusted IO Controller 340 to the CE 320 occurs among the various fabrics and interfaces, and the data flow 373. The data flow 373 thus requires protection from corrupted or spoofed data that may originate from malware or malicious IP, such as the rogue IP 350 connected to an unsecure fabric, Fabric2 334. For example, the rogue IP 350 may be running corrupted firmware or under the control of untrusted software (or malware).

As the data flow 373 reaches the CE 320, the CE 320 intercepts and verifies the data flow 373, and then cryptographically processes the data from the data flow 373. The CE 320 then writes the encrypted data to the memory 360, as shown with data flow 374. The CE 320 may perform various validation operations (e.g., a lookup) to verify that the data flow 373 originates from a trusted IO controller such as the Trusted IO Controller 340. For example, the CE 320 may lookup the CID of the DMA transaction for the data flow 373 against a list of known CIDs in the CE CAM 324. If there is a match with the stored information in the CE CAM 324, the CE 320 encrypts writes of the data to the memory 360 to complete the input operation. If the DMA transaction is not validated, e.g., does not have a match with information in the CE CAM 324, the DMA transaction is not from a trusted source, and is passed through to the memory 360 in the clear.

Figure 3B:
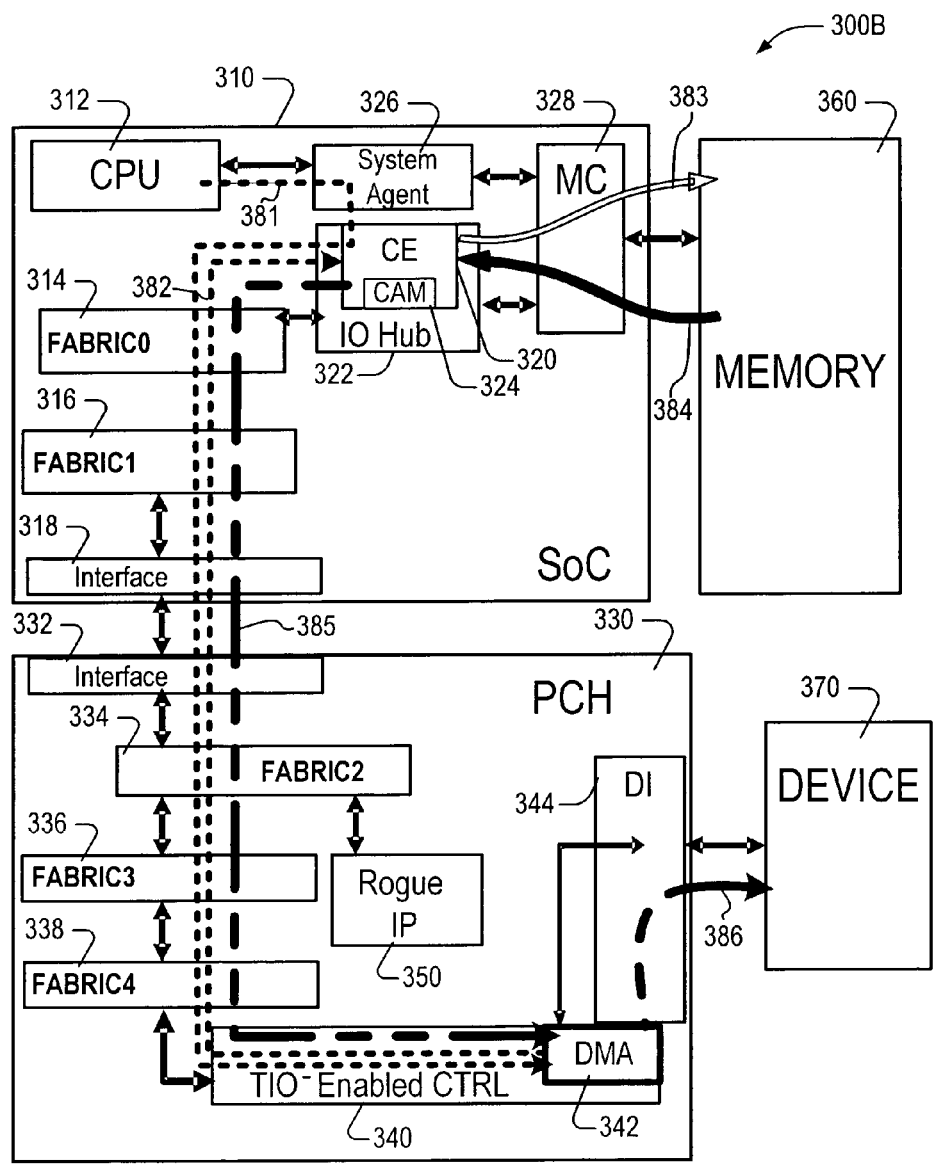
FIG. 3B illustrates a block diagram of a computing system architecture implementing an output data flow between a device and a crypto engine using a configured crypto engine, according to an example.

FIG. 3B illustrates a block diagram of a computing system architecture 300B implementing an output data flow between a device and a crypto engine using a configured crypto engine, according to an example. The block diagram includes the architecture configuration of FIG. 3A, but with an opposite direction of data flows that indicate an output data flow. Thus, it will be understood that the description for the computing system architecture 300A of FIG. 3A may also apply for the elements of the computer system architecture 300B of FIG. 3B.

FIG. 3B depicts an output flow among the SoC 310 and PCH 330, occurring from the memory 360 to the device 370. This flow is shown with flows 381, 382, 383, 384, 385, 386. For example, prior to all output flow, a trusted application first generates the encrypted data to memory. Then, as part of the output flow, an untrusted data flow 381 may occur from the CPU 312, through the SoC 310, to the DMA functionality 342 of the Trusted IO Controller 340. This untrusted data flow 381 may occur as the result of an untrusted driver, for example, executing with instructions in an operating system via the CPU. The untrusted data flow 381 configures the DMA transaction with the DMA functionality 342 of the Trusted IO controller 340, which "rings the doorbell" of the controller to instruct that a trusted output transaction is to obtain the encrypted data from memory.

Next, the data flow 382 from the Trusted IO Controller 340 occurs to initiate the DMA read from memory 360 to the device 370. This data flow 382 is received by the CE 320, which performs a read of the encrypted data with data flow 383. The CE 320 then intercepts and cryptographically processes the encrypted data (e.g., decrypts the data) received in response from the memory 360 with data flow 384. The CE 320 may perform operations to verify that data decrypted from the data flow 384 is to be provided to a trusted IO controller such as the Trusted IO Controller 340. For example, the CE 320 may look up the CID of the DMA transaction against a list of known CIDs in the CE CAM 324. If there is a match with the stored information in the CE CAM 324, the CE 320 decrypts reads of the data from the memory 360. If the CID is not validated, e.g., does not have a match with information in the CE CAM 324, the DMA transaction is not from a trusted source, and so the DMA the transaction is not processed by the CE and sent to the controller.

In response to successful validation of the DMA transaction and the decryption by the CE 320, the CE 320 then sends the now-decrypted data toward the device 370. The now-decrypted data is transmitted through the various fabrics and interfaces of the SoC 310 and the PCH 330 with the data flow 385. (The data flow 385 thus requires protection from being re-rerouted and intercepted from rogue agents, such as the rogue IP 350 connected to the unsecure fabric, Fabric2 334. Such routing protection is further described in FIGS. 4A and 4B.) As the data flow 385 reaches the Trusted IO Controller 340, the DMA functionality 342 receives and processes the data, which is then passed on to the device 370 with the data flow 386 to complete the trusted output operation.

Figure 4A:
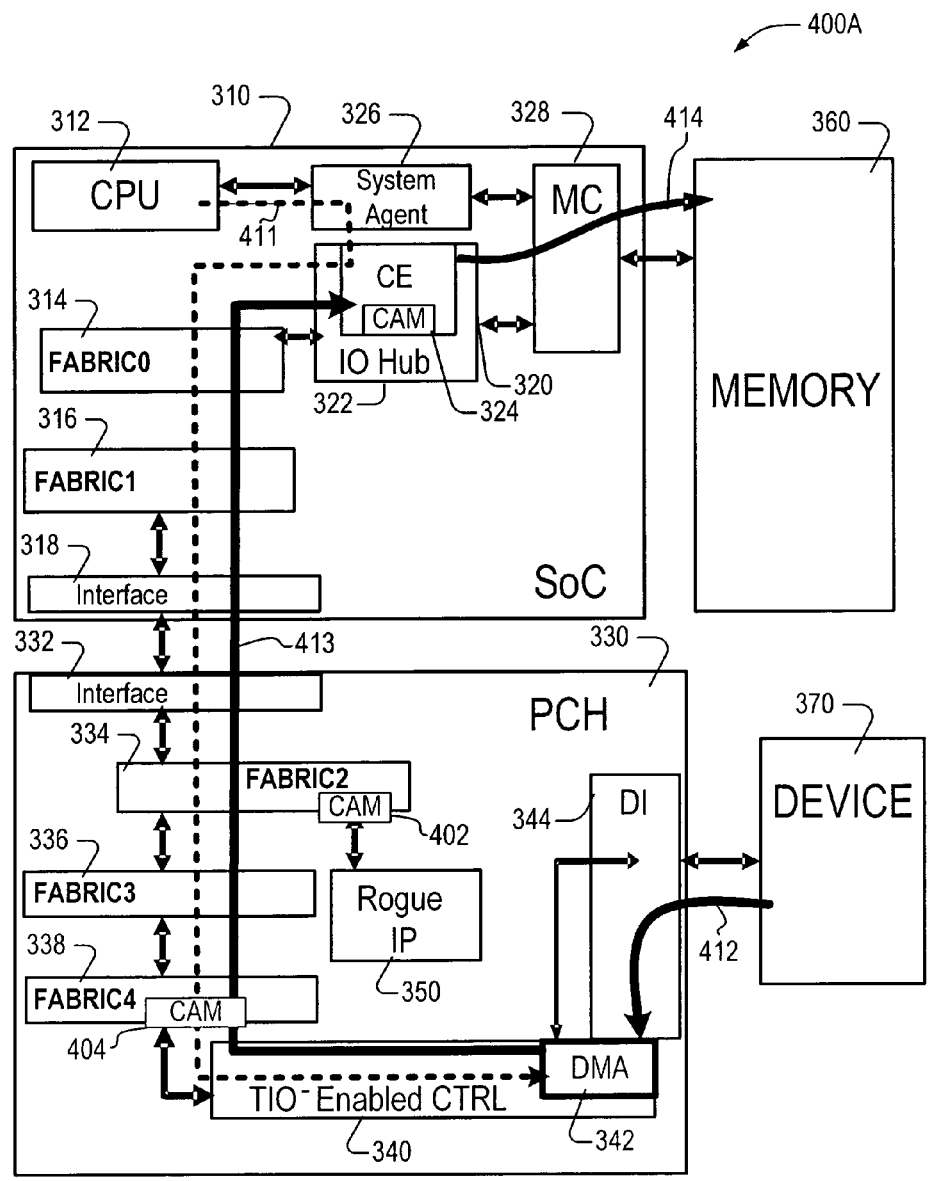
FIG. 4A illustrates a block diagram of a computing system architecture implementing an input data flow between a device and a crypto engine using configured content addressable memory of a fabric, according to an example.

FIG. 4A illustrates a block diagram of a computing system architecture 400A implementing an input data flow between a device and a crypto engine using configured content addressable memory of a fabric, according to an example. The block diagram includes the architecture configuration of FIG. 3A, but with the addition of CAMs 402, 404 (shadow CAMs) that are located in the fabrics 334, 338 respectively. Thus, it will be understood that the role and functionality described for the computing system architecture 300A of FIG. 3A may also apply for the elements of the computing system architecture 400A of FIG. 4A.

The shadow CAMs 402, 404 in the respective fabrics may be programmed using the techniques described above with reference to FIGS. 1 and 2, to identify secure transactions and to prevent re-routing of data from such secure transactions to unintended IP and agents. It will be understood that other shadow CAMs are not depicted for simplicity, but such CAMs may be located and involved with other fabrics and interfaces of this architecture configuration. In an example, a shadow CAM is embedded in each downstream facing port of the fabric. In another example, a shadow CAM is embedded in each fabric and shared across the downstream ports of the fabric.

When the CE CAM 324 is configured with the CID for the secure data transaction, the shadow CAMs 402, 404 in the various fabrics are configured to prevent transactions carrying this CID to be claimed by other IPs. In an example, neither input nor output flows may be started before an acknowledgement of the shadow CAM configuration for all fabrics is complete. Thus, the use of the shadow CAMs among the various fabrics may provide a mechanism by which the processing circuitry may identify the secure transaction, and then enforce rules to detect and block rerouting or other interference with the secure transaction.

An input flow with re-routing detection and control mechanisms is illustrated in FIG. 4A, as implemented with depicted data flows 411, 412, 413, 414. The computing system architecture 400A depicts the untrusted data flow 411 that occurs from the CPU 312 to the Trusted IO Controller 340 to establish and configure a DMA write transaction (e.g., as a result of an untrusted driver to identify that an input transaction is to occur). The data for the DMA write transaction then is provided from the device 370 to the Trusted IO Controller 340 in the data flow 412, and then communicated to the CE 320 in the data flow 413 when the DMA write transaction is performed.

In an example, when the data flow 413 of the DMA write transaction reaches a destination within the other fabrics (e.g., fabrics 314, 316, 334, 336), the CID attached to the DMA write transaction by the Trusted IO Controller 340 is compared to the CID(s) contained in the shadow CAM (if any) for the respective fabric. If data for the DMA write transaction is received at a particular fabric, a determination is made whether the data relates to operations for that particular fabric. If there is a match between the CID attached to the DMA write transaction and the CID contained in the shadow CAM for the respective fabric, it is determined that a trusted IO session for this CID is on-going and the DMA write transaction should not have reached this destination, so as a result, any transaction is aborted at that fabric. If, however, there is no match, the DMA write transaction proceeds in the fabric destination: either a trusted IO session is on-going and the IO controller is the targeted controller, or the transaction is not related to a trusted IO operation and it is not impacted by the trusted IO architecture.

Thus, in the input scenario for the example computing system architecture 400A, the shadow CAM 402 is configured to include the CID of the DMA write transaction from the Trusted IO Controller 340 prior to performing the DMA write transaction (whereas shadow CAM 404 does not include the CID). Any attempt to reroute the transactions of data flow 413 (for IP 340) to rogue IP 350 will be blocked due to the identification of the CID in the CAM 402. As a result, if the data flow 413 is not tampered with or redirected, its transactions continues on to CE 320, allowing CE 320 to encrypt the data and write the encrypted data to the memory 360 with data flow 414.

Figure 4B:
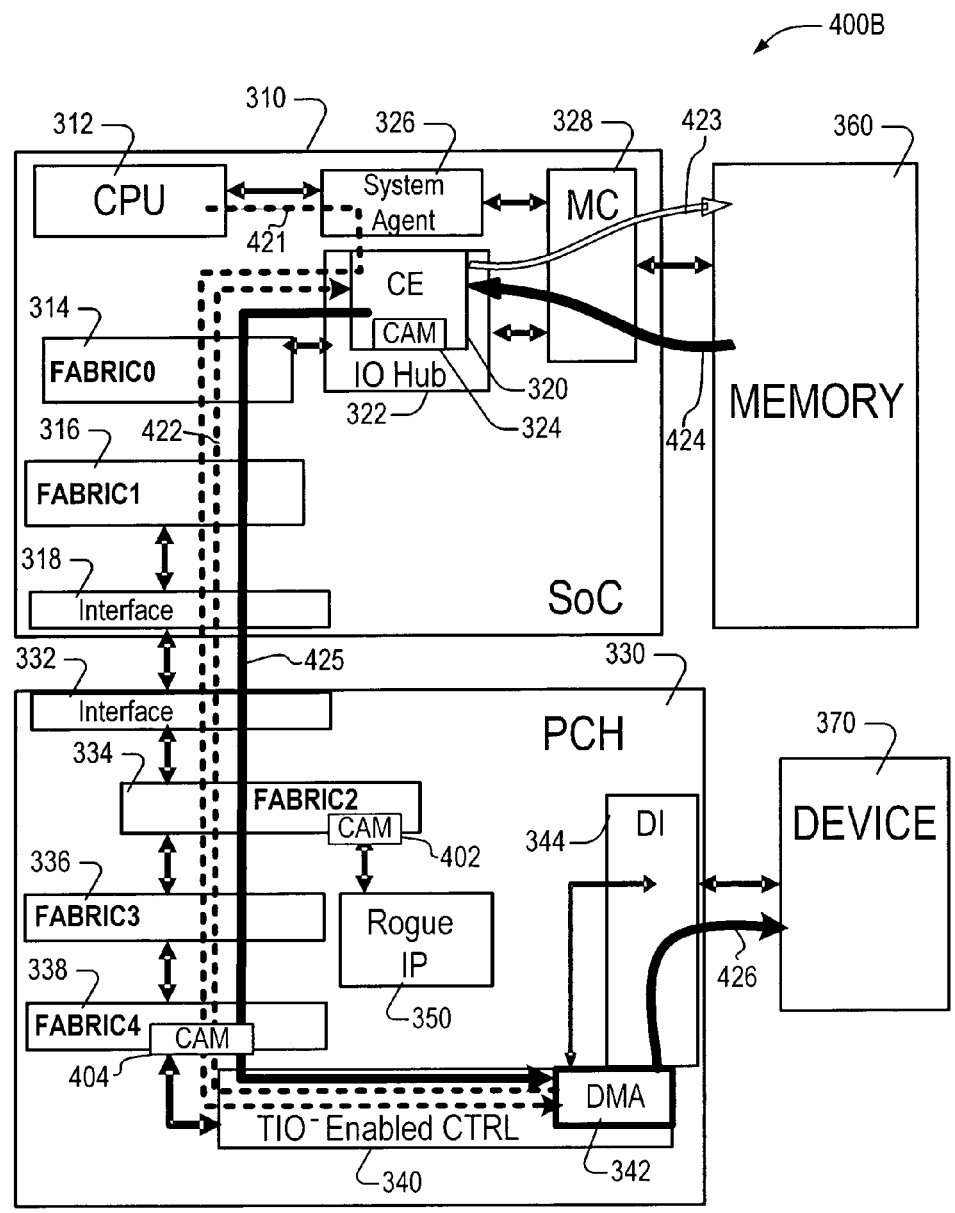
FIG. 4B illustrates a block diagram of a computing system architecture implementing an output data flow between a device and a crypto engine using configured content addressable memory of a fabric, according to an example.

FIG. 4B illustrates a block diagram of a computing system architecture 400B implementing an output data flow between a device and a crypto engine using configured content addressable memory of a fabric, according to an example. The block diagram includes the architecture configuration of FIG. 4A, but with an opposite direction of data flows that indicate an output data flow. Thus, it will be understood that the description for the elements of the computer system architecture 400A of FIG. 4A (including elements described from FIGS. 3A and 3B) may also apply for the elements of the computer system architecture 300B of FIG. 3B.

Again, the shadow CAMs 402, 404 in the respective fabrics may be programmed using the techniques described above with reference to FIGS. 1 and 2, to identify secure transactions and to prevent re-routing of data from such secure transactions to unintended IP and agents. FIG. 4B proceeds to depict an output flow with routing prevent mechanisms, implemented with depicted data flows 421, 422, 423, 424, 425, and 426. The computing system architecture 400B first depicts the untrusted data flow 421 that occurs from the CPU 312 to the DMA functionality 342 of the Trusted IO Controller 340 to establish and configure the DMA transaction (e.g., from an untrusted driver to identify that an output transaction is to occur), and a data flow 422 that occurs between the DMA functionality 342 of the Trusted IO Controller 340 and the CE 320 to initiate the DMA read transaction from memory 360 to the device 370.

The CE 320 checks that the CID of the received read request from 340 is in its CAM. Then the CE 320 initiates a read request to memory (via data flow 423). The data flow 424 then operates to obtain the data from memory. Encrypted data is then decrypted at the CE 320 with use of the encryption key associated with the Trusted IO Controller 340 if the CID of the request is included in the CE CAM. (If the CID is not present in the CE CAM, the data will be read for a device that is not involved in a trusted IO operation). In an example, after decryption at the CE 320, the CE 320 operates to attach a Transaction Layer Packet (TLP) prefix, indicating the CID of the requester (e.g., the requester originating the data flow 422). The CE 320 transmits the transaction to the Trusted IO Controller 340, based on the requester ID, and performs validation operations to ensure that the requested DMA read completion transaction is valid. The CE 320 then performs the data flow 425 of the unencrypted data to the DMA functionality 342 of the Trusted IO Controller 340 through the unsecure fabrics.

Similar to the trusted output scenario for the example computing system architecture 400A in FIG. 4A, shadow CAM 402 of Fabric2 is configured to include the CID of the DMA read transaction prior to performing the DMA read transaction (whereas shadow CAM 404 of Fabric4 does not include the CID). The shadow CAM 404 is not configured because the associated fabric Fabric4 338 is the destination of the decrypted data. Any transactions of the data flow 425 maliciously rerouted to the rogue IP 350 are not able to be received by rogue IP 350 due to the identification of the CID in the CAM 402. If the data flow 425 is not tampered with or redirected, it will continue from CE 320 to the Trusted IO Controller 340, which obtains the data from the DMA read completion transaction and provides the data to the device with data flow 426.

In a further example, a plurality of devices (that includes device 370) may be attached or communicatively coupled to the Trusted IO Controller 340, with each of the plurality of devices performing respective DMA transactions that require protection within the unsecure fabrics. In this scenario, different CIDs may be generated for each device attached to the Trusted IO Controller 340 and each DMA channel used by a device of the plurality of devices. Other variations to enable the identification of multiple trusted transactions may be implemented within the CE CAM 324, shadow CAMs 402, 404, or other locations in the architecture.

Figure 5A:
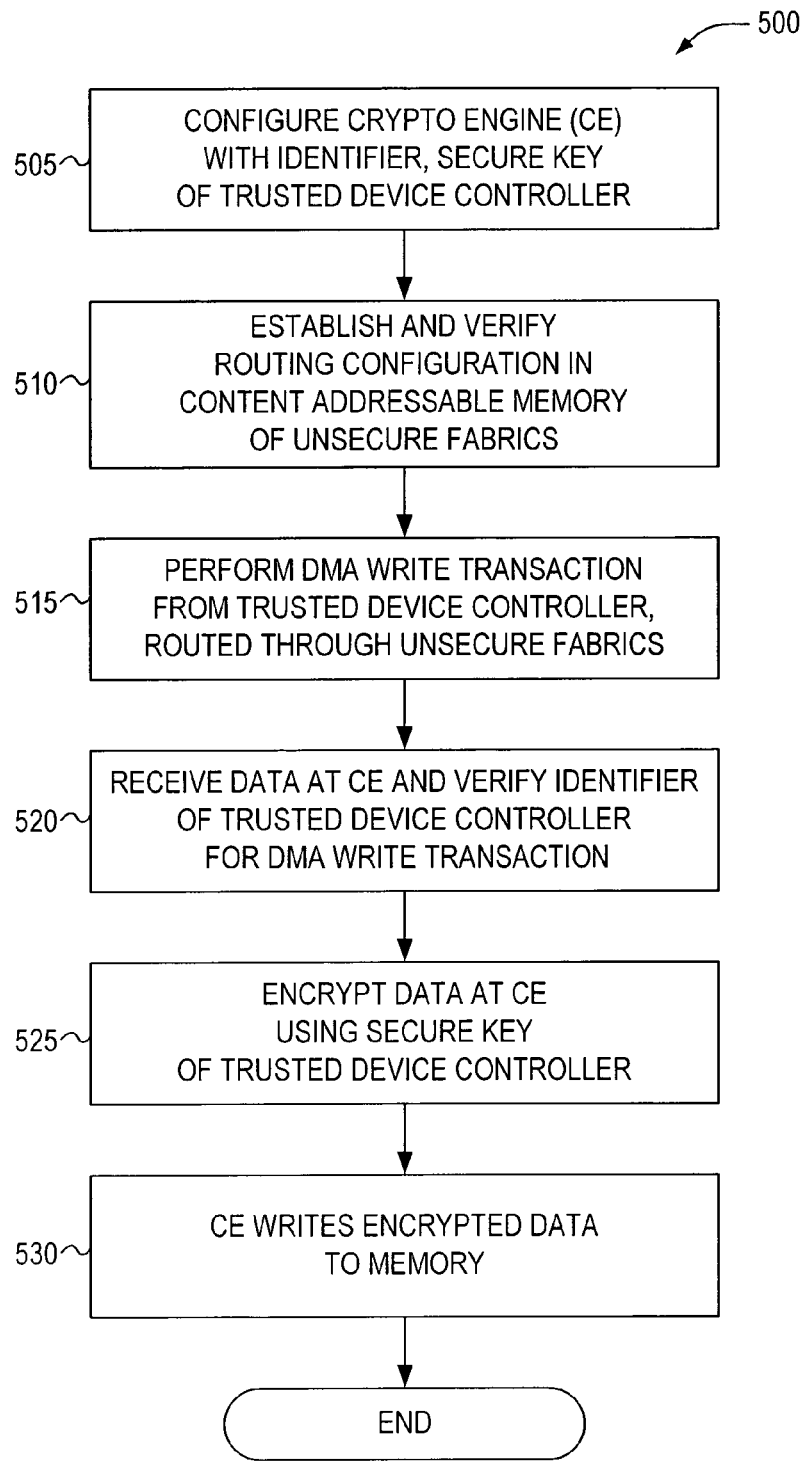
FIG. 5A illustrates a flowchart of a method for implementing an input data flow with configuration of a crypto engine, fabrics, and trusted controllers, according to an example.

FIG. 5A illustrates a flowchart 500 of a method for implementing a input data flow with configuration of a crypto engine, fabrics, and trusted controllers, according to an example. The following operations of flowchart 500 may be implemented in a computing architecture for a DMA write transaction with a device associated with a trusted IO controller, to write data originating from the device to memory. For example, operations of the flowchart 500 may be implemented within a computing system circuitry, such as may be performed by a SoC, PCH, microcontroller, or like component using configured hardware and implemented logic operations.

In the flowchart 500, to facilitate a setup of a DMA write transaction, a CE may be configured with a CID of the known transaction and secure key associated with a trusted device controller of the known transaction (operation 505). For example, the secure key may be generated for the transaction, obtained from an association with the device controller, or derived from unique information known to the CE about the controller or device transaction. In another example, the key can also be generated by the trusted application and programmed to the CE using an instruction. The CE or an IO processor may then perform operations to establish and verify a routing configuration in the shadow CAMs of the various fabrics (the unsecure fabrics) (operation 510), so that data in the following DMA write transaction will not be routed to an incorrect entity. In an example, this may include an acknowledgement requirement that the shadow CAM configuration for all fabrics is complete. In an example, operations 505 and 510 are performed as part of a common instruction and occur in combination (e.g., concurrently or consecutively).

Operations are then performed as part of the DMA write transaction, such as the commencement of data flows that occur from the trusted device controller through the unsecure fabrics (operation 515). The data is received at the CE, and then verified to ensure that the CID of the DMA write transaction matches the CID of the trusted device controller (operation 520). If verification successfully occurs, the CE encrypts the data using the secure key associated with the trusted device controller (operation 525). Finally, the CE writes the encrypted data to memory (operation 530), thus concluding the DMA write transaction.

Figure 5B:
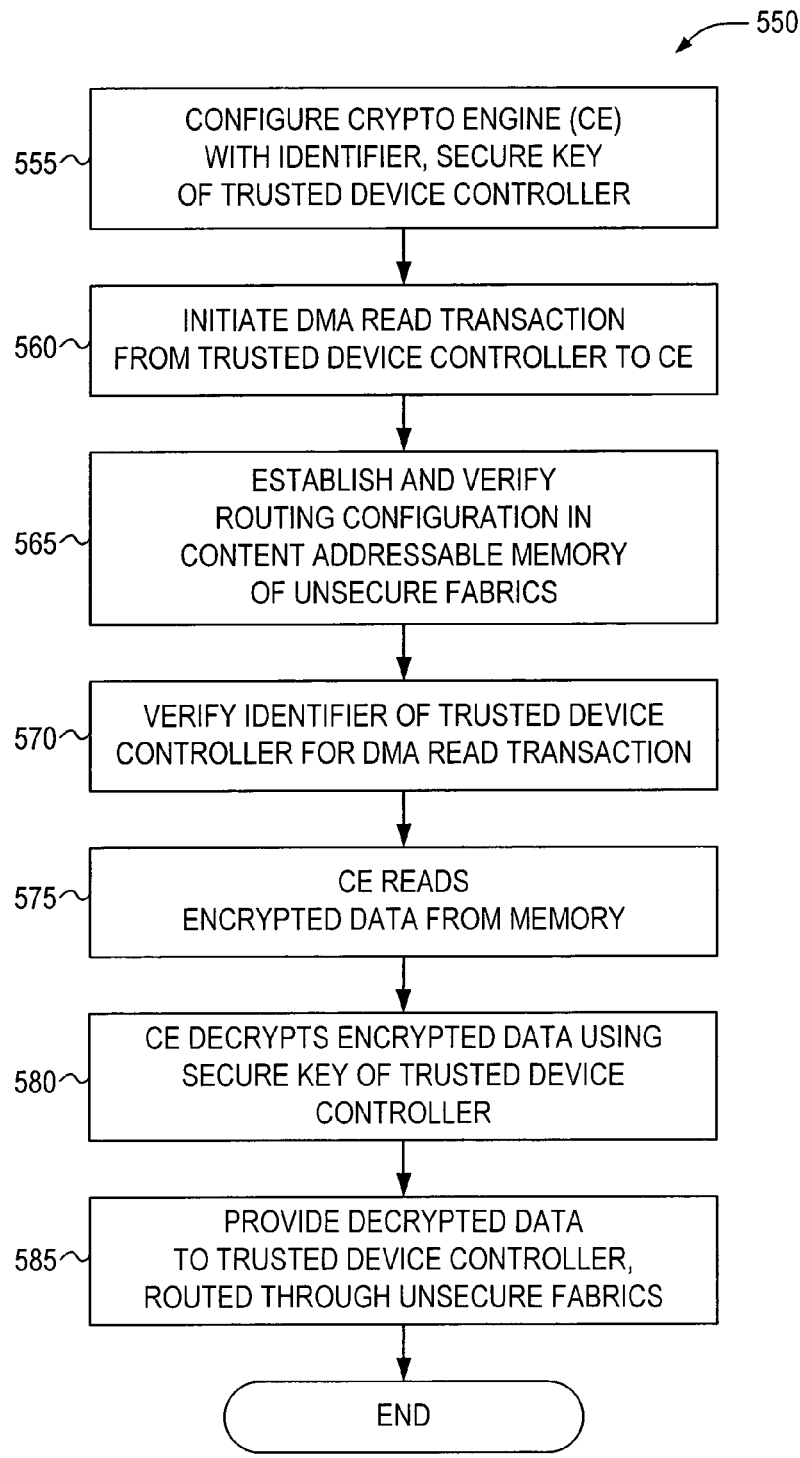
FIG. 5B illustrates a flowchart of a method for implementing an output data flow with configuration of a crypto engine, fabrics, and trusted controllers, according to an example.

FIG. 5B illustrates a flowchart 550 of a method for implementing an output data flow with configuration of a crypto engine, fabrics, and trusted controllers, according to an example. For example, the following operations of flowchart 550 may be implemented in a computing architecture for a DMA transaction with a device associated with a trusted IO controller, to read data originating from memory and communicate such data back to the device. For example, operations of the flowchart 550 may be implemented within a computing system circuitry, such as may be performed by a SoC, PCH, microcontroller, or like component using configured hardware and implemented logic operations.

In the flowchart 550, to facilitate a setup of a DMA read transaction, a CE may be configured with a CID of the known transaction and secure key associated with a trusted device controller of the known transaction (operation 555). For example, the secure key may be pre-stored by the CE, generated and stored as part of a DMA write transaction, obtained from an association with the device controller, or derived from unique information known to the CE about the controller or device transaction.

Operations are then performed to initiate the DMA read transaction, such as performing the request for DMA data from the trusted device controller to the CE or an IO processor (operation 560). The CE or an IO processor may then perform operations to establish and verify a routing configuration in the shadow CAMs of the various fabrics (the unsecure fabrics) (operation 565), so that the subsequently transferred unencrypted data will not be routed to an incorrect entity. In an example, this may include an acknowledgement requirement that the shadow CAM configuration for all fabrics is complete. (The verification of the routing configuration may be performed only once when the key is written, while numerous transactions may occur between key writes). In an example, operations 555 and 565 are performed as part of a common instruction and occur in combination (e.g., concurrently or consecutively). For example, a trusted application may program the CE with the channel information (e.g., CID and associated key) and perform the verification as part of a CE programming instruction.

In an example, the DMA transaction (e.g., a trusted output transaction) is initiated only after successful completion of operations 555 and 565. The DMA data is received at the CE or the IO processor, and then verified to ensure that the CID of the DMA read transaction matches the CID of the trusted device controller (operation 570).

In response to looking up (e.g., obtaining or verifying) the CID of the trusted device controller for the requested DMA read transaction, the CE reads the encrypted data from memory (operation 575), and then decrypts the encrypted data using the secure key of the trusted device controller (operation 580). Then, the decrypted data is provided from the CE in a data flow to the trusted device controller, the data being routed through the unsecure fabrics (operation 585). As discussed above, the routing configuration at the respective unsecure fabrics will prevent interception and tampering of this data at unintended IP. Further operations may occur to then transfer the data received from the DMA read transaction to the device from the trusted device controller, to conclude the DMA read transaction.

Techniques described above are not limited to any particular type of controller, device, or controller/device interface, and may be used with variety of devices that are integrated with, included in, or coupled to a computing system architecture. For example, data for various input sensors and output devices may be used to as part of secure IO transactions, such as for data collected for secure biometric authentication purposes from human input sensors, or secure outputs that represent various forms of sensitive information to a human user. Additionally, although the previous examples were described with reference to DMA transactions to volatile memory, it will be understood that the present technique may apply to other types of memory (e.g., non-volatile memory) and data flow transactions in fabric-connected architectures.

Figure 6:
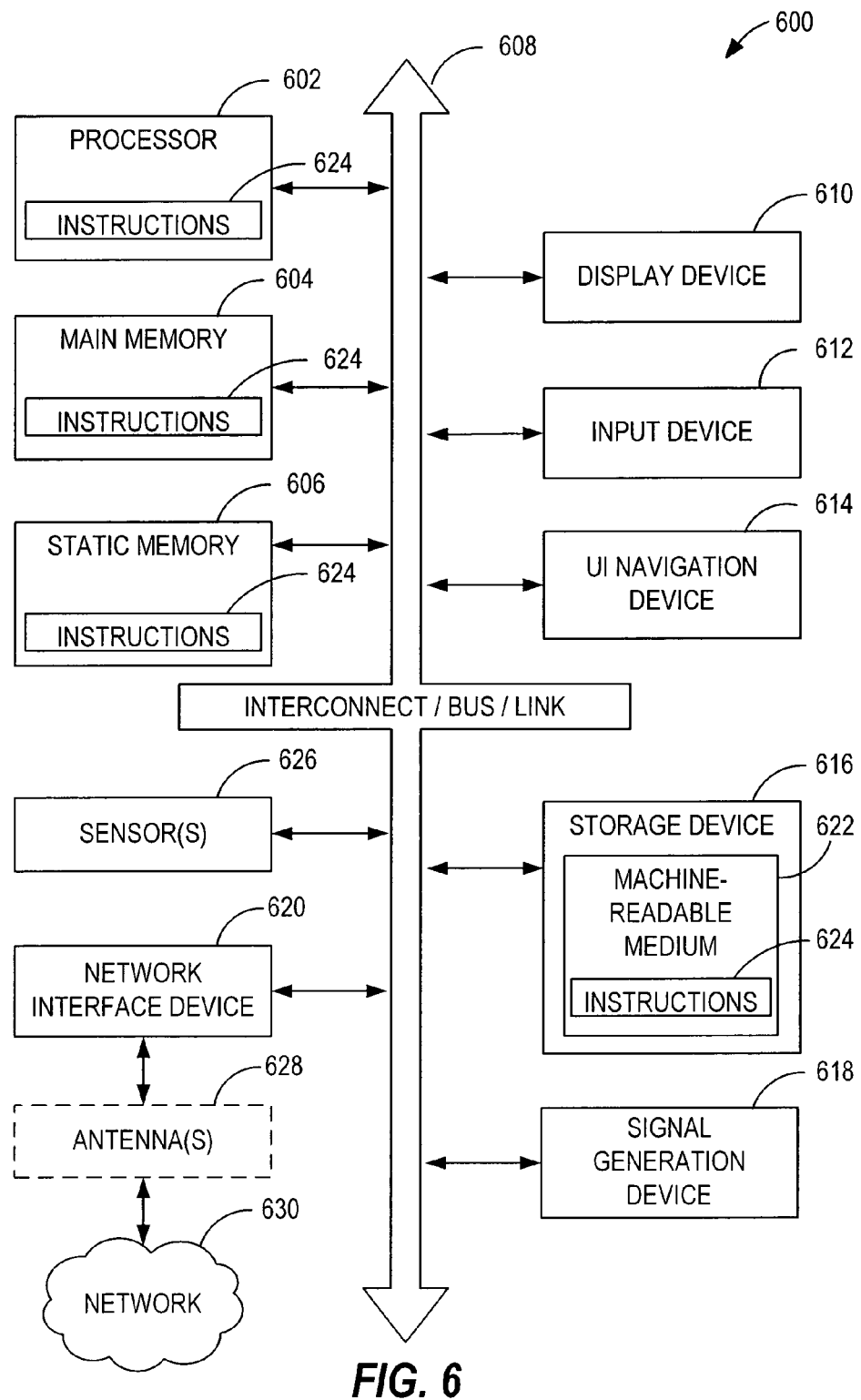
FIG. 6 illustrates a block diagram for an example computer architecture upon which any one or more of the techniques (e.g., operations, processes, methods, and methodologies) discussed herein may be performed, according to an example.

FIG. 6 is a block diagram illustrating a machine in the example form of a computer system 600, within which a set or sequence of instructions may be executed to cause the machine to perform any one of the methodologies discussed herein, according to an example embodiment. The machine may be a computing system device embodying the hardware architecture configurations described above for FIG. 1, 3A, 3B, 4A, or 4B, the hardware architecture operations described above for FIG. 2, 5A, or 5B, or another computing device embodied as a personal computer (PC), a tablet PC, a hybrid tablet/notebook PC, a personal digital assistant (PDA), a mobile telephone or smartphone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via an interconnect 608 (e.g., a link, a bus, etc.). In some examples, such as in certain system-on-chip (SoC) configurations, the processor 602 and main memory 604 may be integrated into a single fabricated chip or circuitry, and may communicate with each other using an internal interface. The computer system 600 may further include a video display unit 610, an alphanumeric input device 612 (e.g., a keyboard), and a user interface (UI) navigation device 614 (e.g., a mouse). In an example, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620 (which may include or operably communicate with a network 630 using one or more antennas 628, transceivers, or other wireless communications hardware), and one or more sensors 626, such as a global positioning system (GPS) sensor, compass, accelerometer, gyroscope, magnetometer, location sensor, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 630 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic and software of a number of components, modules, or mechanisms. Such components are tangible entities (e.g., hardware and software-configured hardware) capable of performing specified operations and may be configured or arranged in a certain manner. In an example, circuitry or circuit sets may be arranged (e.g., internally or with respect to external entities such as other circuitry or circuit sets) in a specified manner as such components. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the component may be embodied or programmed by instructions of a machine readable medium. In an example, software, when executed by the underlying hardware of the component, causes the hardware to perform the specified operations. Thus, such components, modules, or mechanisms are understood to encompass a tangible entity, be that an entity that is physically constructed, specifically configured, temporarily configured, adapted, or programmed to operate in a specified manner or to perform part or all of any operations described herein.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus, comprising: a crypto engine, coupled to a volatile memory and a trusted input output (IO) controller, the crypto engine to perform a DMA transaction that originates from the trusted IO controller with electronic operations in the apparatus that: validate a request for the DMA transaction received from the trusted IO controller, wherein the request for the DMA transaction is validated based on an identifier associated with the DMA transaction and the trusted IO controller, and wherein the trusted IO controller is connected to the crypto engine through a first port of an unsecure fabric; and configure the unsecure fabric to prevent routing of the DMA transaction between the crypto engine and the trusted IO controller to a second port of the unsecure fabric, using the identifier associated with the DMA transaction and the trusted IO controller.

In Example 2, the subject matter of Example 1 optionally includes, wherein the identifier is a channel ID (CID), wherein the CID uniquely identifies bus transactions associated with a DMA channel for the trusted IO controller, and wherein the CID is immutable from change within the apparatus by an untrusted agent, the untrusted agent not included in a trusted computing base (TCB) of the apparatus.

In Example 3, the subject matter of Example 2 optionally includes, wherein operations in the apparatus that validate the request for the DMA transaction include operations to verify the CID within a list of CIDs, the list of CIDs including respective CIDs of a plurality of IO controllers coupled to the crypto engine, and the plurality of IO controllers including the trusted IO controller.

In Example 4, the subject matter of Example 3 optionally includes, wherein the crypto engine includes content addressable memory (CAM), wherein the list of CIDs is stored in the CAM of the CE, wherein the CID is associated with a secure key stored in the CAM of the CE, and wherein the secure key is used for encryption and decryption of data of the DMA transaction that is stored with the volatile memory.

In Example 5, the subject matter of any one or more of Examples 1-4 optionally include, wherein operations in the apparatus that configure the unsecure fabric include operations that store the identifier in a content addressable memory (CAM) of the unsecure fabric, and wherein the unsecure fabric is configured by the apparatus to prevent routing of the DMA transaction to the second port of the unsecure fabric responsive to the identifier stored in the CAM of the unsecure fabric matching the identifier.

In Example 6, the subject matter of Example 5 optionally includes, wherein the CAM of the unsecure fabric resides in a port of the unsecure fabric that is connected to an untrusted IO controller.

In Example 7, the subject matter of any one or more of Examples 5-6 optionally include, wherein the CAM of the unsecure fabric is located in a centralized CAM of the unsecure fabric, the unsecure fabric being connected to an untrusted IO controller.

In Example 8, the subject matter of any one or more of Examples 1-7 optionally include, wherein responsive to successful configuration of the unsecure fabric to prevent routing of the DMA transaction to the second port, the DMA transaction is performed between the trusted IO controller and the volatile memory through encrypted data operations via the crypto engine.

In Example 9, the subject matter of Example 8 optionally includes, wherein the DMA transaction is a DMA write transaction to the volatile memory, wherein the encrypted data operations include operations that encrypt data of the DMA write transaction to the volatile memory, the data of the DMA write transaction communicated in an unencrypted form from the trusted IO controller to the crypto engine through the unsecure fabric, and the data of the DMA write transaction communicated in an encrypted form from the crypto engine to the volatile memory, and wherein the operations that encrypt the data of the DMA write transaction use a secure key associated with the trusted IO controller.

In Example 10, the subject matter of any one or more of Examples 8-9 optionally include, wherein the DMA transaction is a DMA read transaction from the volatile memory, wherein the encrypted data operations include operations that decrypt data of the DMA read transaction from the volatile memory, the data of the DMA read transaction communicated in an encrypted form from the volatile memory to the crypto engine, and the data of the DMA read transaction communicated in an unencrypted form from the crypto engine to the trusted IO controller through the unsecure fabric, and wherein the operations that decrypt data of the DMA read transaction use a secure key associated with the trusted IO controller.

In Example 11, the subject matter of any one or more of Examples 1-10 optionally include, wherein operations in the apparatus that configure the unsecure fabric to prevent routing of the DMA transaction include operations that send an update message within the apparatus to the unsecure fabric using processor microcode, the update message used to provide the identifier to the unsecure fabric, and wherein the unsecure fabric is configured via the processor microcode to prevent interference with any DMA transaction associated with the identifier.

In Example 12, the subject matter of any one or more of Examples 1-11 optionally include, wherein the unsecure fabric includes intellectual property (IP) controlled by a host operating system, and wherein the request for the DMA transaction originates from an untrusted component in the host operating system.

In Example 13, the subject matter of any one or more of Examples 1-12 optionally include: an IO hub, the IO hub coupled to the crypto engine, the IO hub to perform electronic operations in the apparatus that conduct the DMA transaction between the trusted IO controller and the volatile memory, responsive to successful configuration of the unsecure fabric to prevent routing of the DMA transaction to the second port.

In Example 14, the subject matter of any one or more of Examples 1-13 optionally include, wherein the identifier is a channel ID (CID), wherein the CID uniquely identifies bus transactions associated with a DMA channel for the trusted IO controller, and wherein the trusted IO controller is coupled to a plurality of devices including a first device and a second device, wherein the CID is used for performance of the DMA transaction with the first device, and wherein a second is used for performance of the second DMA transaction with the second device.

In Example 15, the subject matter of any one or more of Examples 1-14 optionally include, wherein the trusted IO controller is coupled to an IO device via a device interface, and wherein the trusted IO controller includes DMA functionality to initiate the request for the DMA transaction and perform the DMA transaction with the crypto engine through the unsecure fabric.

In Example 16, the subject matter of any one or more of Examples 1-15 optionally include: the trusted IO controller, wherein the crypto engine is integrated in a System-on-Chip (SoC) and wherein the trusted IO controller is integrated in a Platform Control Hub (PCH) chipset, and wherein the SoC is communicatively coupled to the PCH chipset via a direct media interface (DMI) interconnect.

In Example 17, the subject matter of Example 16 optionally includes, wherein the unsecure fabric is located within the PCH chipset.

In Example 18, the subject matter of any one or more of Examples 16-17 optionally include, wherein the unsecure fabric is located within the SoC.

In Example 19, the subject matter of any one or more of Examples 1-18 optionally include, wherein the crypto engine and the unsecure fabric is included within a System-on-Chip (SoC).

Example 20 is at least one machine readable storage medium, comprising a plurality of instructions that, responsive to being executed with processor circuitry of a computing device, cause the computing device to perform electronic operations that: validate a request for a DMA transaction received from a trusted IO controller, wherein the request for the DMA transaction is validated based on an identifier associated with the DMA transaction and the trusted IO controller, and wherein the DMA transaction is to be performed with the trusted IO controller through an unsecure fabric; and configure the unsecure fabric to prevent routing of the DMA transaction to a second port of the unsecure fabric, using the identifier associated with the DMA transaction and the trusted IO controller.

In Example 21, the subject matter of Example 20 optionally includes, wherein the identifier is a channel ID (CID), wherein the CID uniquely identifies bus transactions associated with a DMA channel for the trusted IO controller, and wherein the CID is immutable from change within the computing device by an untrusted agent.

In Example 22, the subject matter of Example 21 optionally includes, wherein the operations that validate the request for the DMA transaction include operations to verify the CID within a list of CIDs, the list of CIDs including respective CIDs of a plurality of IO controllers, the plurality of IO controllers including the trusted IO controller.

In Example 23, the subject matter of Example 22 optionally includes, wherein the list of CIDs is stored in content addressable memory (CAM) of a crypto engine (CE), wherein the CID is associated with a secure key stored in the CAM of the CE, and wherein the secure key is used for encryption and decryption of data of the DMA transaction that is stored with a volatile memory of the computing device.

In Example 24, the subject matter of any one or more of Examples 20-23 optionally include, wherein the operations that configure the unsecure fabric include operations that store the identifier in a content addressable memory (CAM)

of the unsecure fabric, and wherein the unsecure fabric is configured to prevent routing of the DMA transaction to the second port of the unsecure fabric responsive to the identifier stored in the CAM of the unsecure fabric matching the identifier.

In Example 25, the subject matter of Example 24 optionally includes, wherein the CAM of the unsecure fabric resides in a port of the unsecure fabric that is connected to an untrusted IO controller.

In Example 26, the subject matter of any one or more of Examples 24-25 optionally include, wherein the CAM of the unsecure fabric is located in a centralized CAM of the unsecure fabric, the unsecure fabric being connected to an untrusted IO controller.

In Example 27, the subject matter of any one or more of Examples 20-26 optionally include, wherein responsive to successful configuration of the unsecure fabric to prevent routing of the DMA transaction to the second port, the DMA transaction is performed between the trusted IO controller and a volatile memory through encrypted data operations via a crypto engine.

In Example 28, the subject matter of Example 27 optionally includes, wherein the DMA transaction is a DMA write transaction to the volatile memory, wherein the encrypted data operations include operations that encrypt data of the DMA write transaction to the volatile memory, the data of the DMA write transaction communicated in an unencrypted form from the trusted IO controller to the crypto engine through the unsecure fabric, and the data of the DMA write transaction communicated in an encrypted form from the crypto engine to the volatile memory, and wherein the operations that encrypt the data of the DMA write transaction use a secure key associated with the trusted IO controller.

In Example 29, the subject matter of any one or more of Examples 27-28 optionally include, wherein the DMA transaction is a DMA read transaction from the volatile memory, wherein the encrypted data operations include operations that decrypt data of the DMA transaction from the volatile memory, the data of the DMA read transaction communicated in an encrypted form from the volatile memory to the crypto engine, and the data of the DMA read transaction communicated in an unencrypted form from the crypto engine to the trusted IO controller through the unsecure fabric, and wherein the operations that decrypt the data of the DMA read transaction use a secure key associated with the trusted IO controller.

In Example 30, the subject matter of any one or more of Examples 20-29 optionally include, wherein operations that configure the unsecure fabric include operations that use processor microcode of the computing device to send an update message to the unsecure fabric, the update message used to provide the identifier to the unsecure fabric, and wherein the unsecure fabric is configured via the processor microcode to prevent interference with any DMA transaction associated with the identifier.

In Example 31, the subject matter of any one or more of Examples 20-30 optionally include, wherein the electronic operations are performed by a crypto engine (CE) included within an IO hub, and wherein the operations to conduct the DMA transaction between the trusted IO controller and a volatile memory are performed by the IO hub responsive to successful configuration of the unsecure fabric to prevent routing of the DMA transaction to the second port.

In Example 32, the subject matter of Example 31 optionally includes, wherein the CE and the IO hub are included within System-on-Chip (SoC) circuitry, and wherein the unsecure fabric is included within the SoC circuitry.

In Example 33, the subject matter of any one or more of Examples 31-32 optionally include, wherein the CE and the IO hub are included within System-on-Chip (SoC) circuitry, and wherein the unsecure fabric is included within a chipset coupled to the SoC circuitry.

Example 34 is a method, comprising electronic operations, which when performed by circuitry of a computing device, causes the computing device to perform the electronic operations including: validating a request for a DMA transaction received from a trusted IO controller, wherein the request for the DMA transaction is validated based on an identifier associated with the DMA transaction and the trusted IO controller, and wherein the DMA transaction is performed with the trusted IO controller through a first port of an unsecure fabric; and configuring the unsecure fabric to prevent routing of the DMA transaction to a second port of the unsecure fabric, using the identifier associated with the DMA transaction and the trusted IO controller.

In Example 35, the subject matter of Example 34 optionally includes, wherein the identifier is a channel ID (CID), wherein the CID uniquely identifies bus transactions associated with a DMA channel for the trusted IO controller, and wherein the CID is immutable from change within the computing device by an untrusted agent.

In Example 36, the subject matter of Example 35 optionally includes, wherein validating the request for the DMA transaction includes verifying the CID within a list of CIDs, the list of CIDs including respective CIDs of a plurality of IO controllers, and the plurality of IO controllers including the trusted IO controller.

In Example 37, the subject matter of Example 36 optionally includes, wherein the list of CIDs is stored in content addressable memory (CAM) of a crypto engine (CE), wherein the CID is associated with a secure key stored in the CAM of the CE, and wherein the secure key is used for encryption and decryption of data of the DMA transaction that is stored with a volatile memory of the computing device.

In Example 38, the subject matter of any one or more of Examples 34-37 optionally include, wherein configuring the unsecure fabric includes: storing the identifier in a content addressable memory (CAM) of the unsecure fabric, wherein the unsecure fabric is configured to prevent routing of the DMA transaction to the second port of the unsecure fabric responsive to the identifier stored in the CAM of the unsecure fabric matching the identifier.

In Example 39, the subject matter of Example 38 optionally includes, wherein the CAM of the unsecure fabric resides in the second port of the unsecure fabric, the second port of the unsecure fabric being is connected to an untrusted IO controller.

In Example 40, the subject matter of any one or more of Examples 38-39 optionally include, wherein the CAM of the unsecure fabric is located in a centralized CAM of the unsecure fabric, the unsecure fabric being connected to an untrusted IO controller via the second port.

In Example 41, the subject matter of any one or more of Examples 34-40 optionally include, the operations further including: performing the DMA transaction between the trusted IO controller and a volatile memory through encrypted data operations, responsive to successful configuration of the unsecure fabric to prevent routing of the DMA transaction to the second port.

In Example 42, the subject matter of Example 41 optionally includes, wherein the DMA transaction is a DMA write transaction to the volatile memory, wherein the encrypted data operations include operations that encrypt data of the DMA write transaction to the volatile memory, the data of the DMA write transaction communicated in an unencrypted form from the trusted IO controller to a crypto engine through the unsecure fabric, and the data of the DMA write transaction communicated in an encrypted form from the crypto engine to the volatile memory, and wherein the operations that encrypt the data of the DMA write transaction use a secure key associated with the trusted IO controller.

In Example 43, the subject matter of any one or more of Examples 41-42 optionally include, wherein the DMA transaction is a DMA read transaction from the volatile memory, wherein the encrypted data operations include operations that decrypt data for the DMA read transaction from the volatile memory, the data of the DMA read transaction communicated in an encrypted form from the volatile memory to a crypto engine, and the data of the DMA read transaction communicated in an unencrypted form from the crypto engine to the trusted IO controller through the unsecure fabric, and wherein the operations that decrypt the data of the DMA read transaction use a secure key associated with the trusted IO controller.

In Example 44, the subject matter of any one or more of Examples 34-43 optionally include, wherein configuring the unsecure fabric includes sending an update message to the unsecure fabric using processor microcode of the computing device, the update message used to provide the identifier to the unsecure fabric, and wherein the unsecure fabric is configured via the processor microcode to prevent interference with any DMA transaction including the identifier.

In Example 45, the subject matter of any one or more of Examples 34-44 optionally include, wherein the electronic operations are performed by a crypto engine (CE) included within an IO hub, and wherein the operations to conduct the DMA transaction between the trusted IO controller and a volatile memory are performed by the IO hub responsive to successful configuration of the unsecure fabric to prevent routing of the DMA transaction to the second port.

In Example 46, the subject matter of Example 45 optionally includes, wherein the CE and the IO hub are included within System-on-Chip (SoC) circuitry, wherein the unsecure fabric is included within a chipset coupled to the SoC circuitry.

In Example 47, the subject matter of any one or more of Examples 45-46 optionally include, wherein the CE and the IO hub are included within System-on-Chip (SoC) circuitry, and wherein the unsecure fabric is included within the SoC circuitry.

Example 48 is a machine readable medium including instructions, which when executed by a computing system, cause the computing system to perform any of the methods of Examples 34-47.

Example 49 is an apparatus comprising means for performing any of the methods of Examples 34-47.

Example 50 is an apparatus, comprising: means for validating a request for a DMA transaction received from a trusted IO controller, based on an identifier associated with the DMA transaction and the trusted IO controller, the DMA transaction being performed with the trusted IO controller through an unsecure fabric; and means for configuring the unsecure fabric to prevent routing of the DMA transaction to a second port of the unsecure fabric, using the identifier associated with the DMA transaction and the trusted IO controller.

In Example 51, the subject matter of Example 50 optionally includes means for uniquely identifying bus transactions associated with a DMA channel for the trusted IO controller with a channel ID (CID), wherein the CID is immutable from change within the apparatus by an untrusted agent.

In Example 52, the subject matter of any one or more of Examples 50-51 optionally include means for verifying the CID within a list of CIDs, the list of CIDs including respective identifiers of a plurality of IO controllers, and the plurality of IO controllers including the trusted IO controller.

In Example 53, the subject matter of Example 52 optionally includes means for storing the list of CIDs in a crypto engine (CE); and means for storing a secure key in the CE, wherein the secure key is associated with the identifier for the trusted IO controller, and wherein the secure key is used for encryption and decryption of data of the DMA transaction that is stored with a volatile memory.

In Example 54, the subject matter of any one or more of Examples 50-53 optionally include means for storing the identifier in a content addressable memory (CAM) of the unsecure fabric, wherein the unsecure fabric is configured to prevent routing of the DMA transaction to the second port responsive to the identifier stored in the CAM of the unsecure fabric matching the identifier.

In Example 55, the subject matter of any one or more of Examples 50-54 optionally include means for performing the DMA transaction between the trusted IO controller and a volatile memory through encrypted data operations, responsive to successful configuration of the unsecure fabric to prevent routing of the DMA transaction to the second port.

In Example 56, the subject matter of Example 55 optionally includes means for performing a DMA write transaction to the volatile memory; means for encrypting data of the DMA transaction to the volatile memory, using a secure key associated with the trusted IO controller; and means for communicating the data of the DMA write transaction in an unencrypted form from the trusted IO controller through the unsecure fabric, and communicating the data of the DMA write transaction in an encrypted form to the volatile memory.

In Example 57, the subject matter of any one or more of Examples 55-56 optionally include means for performing a DMA read transaction to the volatile memory; means for decrypting data of the DMA read transaction to the volatile memory, using a secure key associated with the trusted IO controller; and means for communicating the data of the DMA read transaction in an encrypted form from the volatile memory, and communicating the data of the DMA read transaction in an decrypted form to the trusted IO controller through the unsecure fabric.

In Example 58, the subject matter of any one or more of Examples 50-57 optionally include means for sending an update message to the unsecure fabric, the update message used to provide the identifier to the unsecure fabric, wherein the unsecure fabric is configured to prevent interference with any DMA transaction including the identifier.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be deter-

What is claimed is:

1. An apparatus, comprising:
a crypto engine, coupled to a volatile memory and a trusted input output (IO) controller, the crypto engine to perform a direct memory access (DMA) transaction that originates from the trusted IO controller with electronic operations in the apparatus that:
validate a request for the DMA transaction received from the trusted IO controller, wherein the request for the DMA transaction is validated based on a channel identifier (CID) comprising a controller identification value and a DMA channel identification value, wherein the trusted IO controller is connected to the crypto engine through a first port of an unsecure fabric, wherein the controller identification value uniquely identifies the trusted IO controller, and wherein the DMA channel identification value uniquely identifies a DMA channel used for the DMA transaction; and
configure the unsecure fabric to store the CID in a content addressable memory (CAM) of the unsecure fabric and to prevent routing of the DMA transaction between the crypto engine and the trusted IO controller to a second port of the unsecure fabric, using the CID associated with the DMA transaction request matching the CID stored in the CAM of the unsecure fabric.

2. The apparatus of claim 1,
wherein the CID uniquely identifies bus transactions associated with a DMA channel for the trusted IO controller, and
wherein the crypto engine prevents a change of the CID from within the apparatus by an untrusted agent, the untrusted agent not included in a trusted computing base (TCB) of the apparatus.

3. The apparatus of claim 2, wherein operations in the apparatus that validate the request for the DMA transaction include operations to verify the CID within a list of CIDs, the list of CIDs including respective CIDs of a plurality of IO controllers coupled to the crypto engine, and the plurality of IO controllers including the trusted IO controller.

4. The apparatus of claim 3,
wherein the crypto engine includes content addressable memory (CAM), wherein the list of CIDs is stored in the CAM of the CE,
wherein the CID is associated with a secure key stored in the CAM of the CE, and
wherein the secure key is used for encryption and decryption of data of the DMA transaction that is stored with the volatile memory.

5. The apparatus of claim 1, wherein responsive to successful configuration of the unsecure fabric to prevent routing of the DMA transaction to the second port, the DMA transaction is performed between the trusted IO controller and the volatile memory through encrypted data operations via the crypto engine.

6. The apparatus of claim 5,
wherein the DMA transaction is a DMA write transaction to the volatile memory,
wherein the encrypted data operations include operations that encrypt data of the DMA write transaction to the volatile memory, the data of the DMA write transaction communicated in an unencrypted form from the trusted IO controller to the crypto engine through the unsecure fabric, and the data of the DMA write transaction communicated in an encrypted form from the crypto engine to the volatile memory, and
wherein the operations that encrypt the data of the DMA write transaction use a secure key associated with the trusted IO controller.

7. The apparatus of claim 5,
wherein the DMA transaction is a DMA read transaction from the volatile memory,
wherein the encrypted data operations include operations that decrypt data of the DMA read transaction from the volatile memory, the data of the DMA read transaction communicated in an encrypted form from the volatile memory to the crypto engine, and the data of the DMA read transaction communicated in an unencrypted form from the crypto engine to the trusted TO controller through the unsecure fabric, and
wherein the operations that decrypt data of the DMA read transaction use a secure key associated with the trusted IO controller.

8. The apparatus of claim 1,
wherein operations in the apparatus that configure the unsecure fabric to prevent routing of the DMA transaction include operations that send an update message within the apparatus to the unsecure fabric using processor microcode, the update message used to provide the CID to the unsecure fabric, and
wherein the unsecure fabric is configured via the processor microcode to prevent interference with any DMA transaction associated with the CID.

9. The apparatus of claim 1,
wherein the unsecure fabric includes intellectual property (IP) controlled by a host operating system, and
wherein the request for the DMA transaction originates from an untrusted component in the host operating system.

10. The apparatus of claim 1, further comprising:
an IO hub, the IO hub coupled to the crypto engine, the IO hub to perform electronic operations in the apparatus that conduct the DMA transaction between the trusted IO controller and the volatile memory, responsive to successful configuration of the unsecure fabric to prevent routing of the DMA transaction to the second port.

11. The apparatus of claim 1,
wherein the CID uniquely identifies bus transactions associated with a DMA channel for the trusted IO controller, and
wherein the trusted IO controller is coupled to a plurality of devices including a first device and a second device, wherein the CID is used for performance of the DMA transaction with the first device, and wherein a second CID is used for performance of a second DMA transaction with the second device.

12. The apparatus of claim 1, wherein the crypto engine and the unsecure fabric is included within a System-on-Chip (SoC).

13. At least one non-transitory machine readable storage medium, comprising a plurality of instructions that, responsive to being executed with processor circuitry of a computing device, cause the computing device to perform electronic operations that:
validate a request for a direct memory access (DMA) transaction received from a trusted IO controller, wherein the request for the DMA transaction is validated based on a channel identifier (CID) comprising a controller identification value and a DMA channel identification value, wherein the DMA transaction is to be performed with the trusted IO controller through an unsecure fabric, wherein the controller identification value uniquely identifies the trusted IO controller, and wherein the DMA channel identification value uniquely identifies a DMA channel used for the DMA transaction; and configure the unsecure fabric to store the CID in a content addressable memory (CAM) of the unsecure fabric and to prevent routing of the DMA transaction to a second port of the unsecure fabric, using the CID associated with the DMA transaction request matching the CID stored in the CAM of the unsecure fabric.

14. The non-transitory machine readable storage medium of claim 13,
wherein the CID uniquely identifies bus transactions associated with a DMA channel for the trusted IO controller, and
wherein change of the CID is prevented from within the computing device by an untrusted agent.

15. The non-transitory machine readable storage medium of claim 14, wherein the operations that validate the request for the DMA transaction include operations to verify the CID within a list of CIDs, the list of CIDs including respective CIDs of a plurality of IO controllers, the plurality of IO controllers including the trusted IO controller.

16. The non-transitory machine readable storage medium of claim 13, wherein responsive to successful configuration of the unsecure fabric to prevent routing of the DMA transaction to the second port, the DMA transaction is performed between the trusted IO controller and a volatile memory through encrypted data operations via a crypto engine.

17. The non-transitory machine readable storage medium of claim 16,
wherein the DMA transaction is a DMA write transaction to the volatile memory,
wherein the encrypted data operations include operations that encrypt data of the DMA write transaction to the volatile memory, the data of the DMA write transaction communicated in an unencrypted form from the trusted IO controller to the crypto engine through the unsecure fabric, and the data of the DMA write transaction communicated in an encrypted form from the crypto engine to the volatile memory, and
wherein the operations that encrypt the data of the DMA write transaction use a secure key associated with the trusted IO controller.

18. The non-transitory machine readable storage medium of claim 16,
wherein the DMA transaction is a DMA read transaction from the volatile memory,
wherein the encrypted data operations include operations that decrypt data of the DMA transaction from the volatile memory, the data of the DMA read transaction communicated in an encrypted form from the volatile memory to the crypto engine, and the data of the DMA read transaction communicated in an unencrypted form from the crypto engine to the trusted IO controller through the unsecure fabric, and
wherein the operations that decrypt the data of the DMA read transaction use a secure key associated with the trusted IO controller.

19. The non-transitory machine readable storage medium of claim 13,
wherein the electronic operations are performed by a crypto engine (CE) included within an IO hub, and
wherein the operations to conduct the DMA transaction between the trusted IO controller and a volatile memory are performed by the IO hub responsive to successful configuration of the unsecure fabric to prevent routing of the DMA transaction to the second port.

20. The non-transitory machine readable storage medium of claim 19,
wherein the CE and the IO hub are included within System-on-Chip (SoC) circuitry, and
wherein the unsecure fabric is included within the SoC circuitry.

21. A method, comprising electronic operations, which when performed by circuitry of a computing device, causes the computing device to perform the electronic operations including:
validating a request for a direct memory access (DMA) transaction received from a trusted IO controller, wherein the request for the DMA transaction is validated based on a channel identifier (CID) comprising a controller identification value and a DMA channel identification value, wherein the DMA transaction is performed with the trusted IO controller through a first port of an unsecure fabric, wherein the controller identification value uniquely identifies the trusted IO controller, and wherein the DMA channel identification value uniquely identifies a DMA channel used for the DMA transaction; and
configuring the unsecure fabric to store the identifier in a content addressable memory (CAM) of the unsecure fabric and to prevent routing of the DMA transaction to a second port of the unsecure fabric, using the CID associated with the DMA transaction request matching the CID stored in the CAM of the unsecure fabric.

22. The method of claim 21,
wherein the CID uniquely identifies bus transactions associated with a DMA channel for the trusted IO controller, and
wherein change of the CID is prevented from within the computing device by an untrusted agent.

23. The method of claim 22,
wherein validating the request for the DMA transaction includes verifying the CID within a list of CIDs, the list of CIDs including respective CIDs of a plurality of IO controllers, and the plurality of IO controllers including the trusted IO controller.

* * * * *

UNITED STATES PATENT AND TRADEMARK OFFICE
CERTIFICATE OF CORRECTION

PATENT NO. : 10,013,579 B2
APPLICATION NO. : 14/757387
DATED : July 3, 2018
INVENTOR(S) : Elbaz et al.

Page 1 of 1

It is certified that error appears in the above-identified patent and that said Letters Patent is hereby corrected as shown below:

In the Claims

In Column 24, Line 13, in Claim 7, delete "TO" and insert --IO-- therefor

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*